(12) United States Patent
Honda

(10) Patent No.: US 10,871,931 B2
(45) Date of Patent: Dec. 22, 2020

(54) DISPLAY DEVICE AND CONTROL METHOD OF DISPLAY DEVICE

(71) Applicant: SEIKO EPSON CORPORATION, Tokyo (JP)

(72) Inventor: Masahiko Honda, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 16/021,652

(22) Filed: Jun. 28, 2018

(65) Prior Publication Data

US 2019/0012130 A1 Jan. 10, 2019

(30) Foreign Application Priority Data

Jul. 6, 2017 (JP) ................................. 2017-132514

(51) Int. Cl.
*G06F 3/14* (2006.01)
*G09G 5/14* (2006.01)
*H04N 5/262* (2006.01)
*H04N 9/31* (2006.01)

(52) U.S. Cl.
CPC ............. *G06F 3/1446* (2013.01); *G09G 5/14* (2013.01); *H04N 5/2624* (2013.01); *H04N 9/3188* (2013.01); *G09G 2340/04* (2013.01); *G09G 2340/0442* (2013.01); *G09G 2340/0492* (2013.01); *G09G 2370/20* (2013.01)

(58) Field of Classification Search
CPC .. G06F 3/1446; H04N 9/3188; H04N 5/2624; G09G 5/14; G09G 2340/0492; G09G 2340/04; G09G 2340/0442; G09G 2370/20
See application file for complete search history.

(56) References Cited

U.S. PATENT DOCUMENTS

| | | | |
|---|---|---|---|
| 2013/0238724 A1* | 9/2013 | Cunningham | ...... G06F 3/04842 709/206 |
| 2014/0092136 A1 | 4/2014 | Aoshima et al. | |
| 2015/0138040 A1 | 5/2015 | Teramae | |
| 2018/0277062 A1* | 9/2018 | Shinozaki | ................ G09G 5/28 |

FOREIGN PATENT DOCUMENTS

| | | |
|---|---|---|
| JP | 2013113936 A | 6/2013 |
| JP | 2014071377 A | 4/2014 |
| JP | 2015060021 A | 3/2015 |
| JP | 2015102567 A | 6/2015 |

* cited by examiner

*Primary Examiner* — Tapas Mazumder
(74) *Attorney, Agent, or Firm* — Oliff PLC

(57) ABSTRACT

A display device includes: a generating unit that generates a display image including a first area where a first image is disposed and a second area where a second image is disposed; and a display unit that displays the display image on a display surface. The display image includes a specific area. The specific area is split into the first area and the second area. The generating unit determines the position of a boundary between the first area and the second area based on the shape of the first image and the shape of the second image.

5 Claims, 8 Drawing Sheets

DISPLAY DEVICE AND CONTROL METHOD OF DISPLAY DEVICE

CROSS-REFERENCE

The entire disclosure of Japanese Patent Application No. 2017-132514, filed Jul. 6, 2017 is expressly incorporated by reference herein.

BACKGROUND

1. Technical Field

The present invention relates to a display device and a control method of a display device.

2. Related Art

JP-A-2013-113936 discloses an image display device that splits one display area into a plurality of areas (hereinafter referred to as "partial areas") and displays an image according to image information received from a personal computer (PC) in each partial area.

In the image display device, the position of the boundary between the partial areas in the display area is fixed.

Incidentally, a device that can provide image information to an image display device is not limited to a PC, but is diverse. Consequently, the aspect ratio (resolution) of an image provided to the image display device is also diverse.

On the other hand, in the image display device disclosed in JP-A-2013-113936, the position of the boundary between the partial areas in the display area is fixed, and therefore, the aspect ratio of the partial area is fixed.

For this reason, when the degree of coincidence between the aspect ratio of the image displayed in the partial area and the aspect ratio of the partial area is low, a non-display area where the image is not displayed is increased in the partial area. Therefore, a technique by which the non-display area can be reduced is desired.

SUMMARY

An advantage of some aspects of the invention is to provide a technique by which a non-display area can be reduced.

A display device according to an aspect of the invention includes: a generating unit that generates a display image including a first area where a first image is disposed and a second area where a second image is disposed; and a display unit that displays the display image on a display surface, wherein the display image includes a specific area, the specific area is split into the first area and the second area, and the generating unit determines the position of a boundary between the first area and the second area based on the shape of the first image and the shape of the second image.

According to the aspect, the position of the boundary between the first area and the second area is determined based on the shape of the first image and the shape of the second image. For this reason, the shape of the first area and the shape of the second area can be changed based on the shape of the first image and the shape of the second image. Hence, compared to the case where the shape of the first area and the shape of the second area are fixed, the degree of coincidence between the shape of the first area and the shape of the first image and the degree of coincidence between the shape of the second area and the shape of the second image can be made high, and the non-display area can be reduced in the display image.

In the display device according to the aspect described above, it is desirable that the generating unit maximizes the size of the first image, while maintaining the aspect ratio thereof, to fit in the first area, maximizes the size of the second image, while maintaining the aspect ratio thereof, to fit in the second area, and determines the position of the boundary such that the size of a fifth area obtained by combining a third area where the first image is not present in the first area with a fourth area where the second image is not present in the second area is smaller than that when the boundary is located at a reference position where the boundary makes the size of the first area equal to the size of the second area.

According to the aspect with this configuration, the non-display area can be reduced in the display image.

In the display device according to the aspect described above, it is desirable that when, in a situation where the first area and the second area are in a positional relationship in which the first area and the second area are arranged in a first direction, the length of the first image in the first direction is equal to the length of the first area in the first direction and also the length of the second image in the first direction is shorter than the length of the second area in the first direction with the boundary located at the reference position, the generating unit positions the boundary on the second area side of the reference position.

According to the aspect with this configuration, the non-display area in the first direction can be reduced in the display image.

In the display device according to the aspect described above, it is desirable that the first direction is a horizontal direction of the display image or a vertical direction of the display image.

According to the aspect with this configuration, the non-display area in the display image can be reduced in a situation where the first area and the second area are in a horizontally arranged positional relationship or a vertically arranged positional relationship.

A control method of a display device according to an aspect of the invention includes: generating a display image including a first area where a first image is disposed and a second area where a second image is disposed; and displaying the display image on a display surface, wherein the display image includes a specific area, the specific area is split into the first area and the second area, and in the generating of the display image, the position of a boundary between the first area and the second area is determined based on the shape of the first image and the shape of the second image.

According to the aspect, the position of the boundary between the first area and the second area is determined based on the shape of the first image and the shape of the second image. For this reason, the shape of the first area and the shape of the second area can be changed based on the shape of the first image and the shape of the second image. Hence, compared to the case where the shape of the first area and the shape of the second area are fixed, the degree of coincidence between the shape of the first area and the shape of the first image and the degree of coincidence between the shape of the second area and the shape of the second image can be made high, and the non-display area can be reduced in the display image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
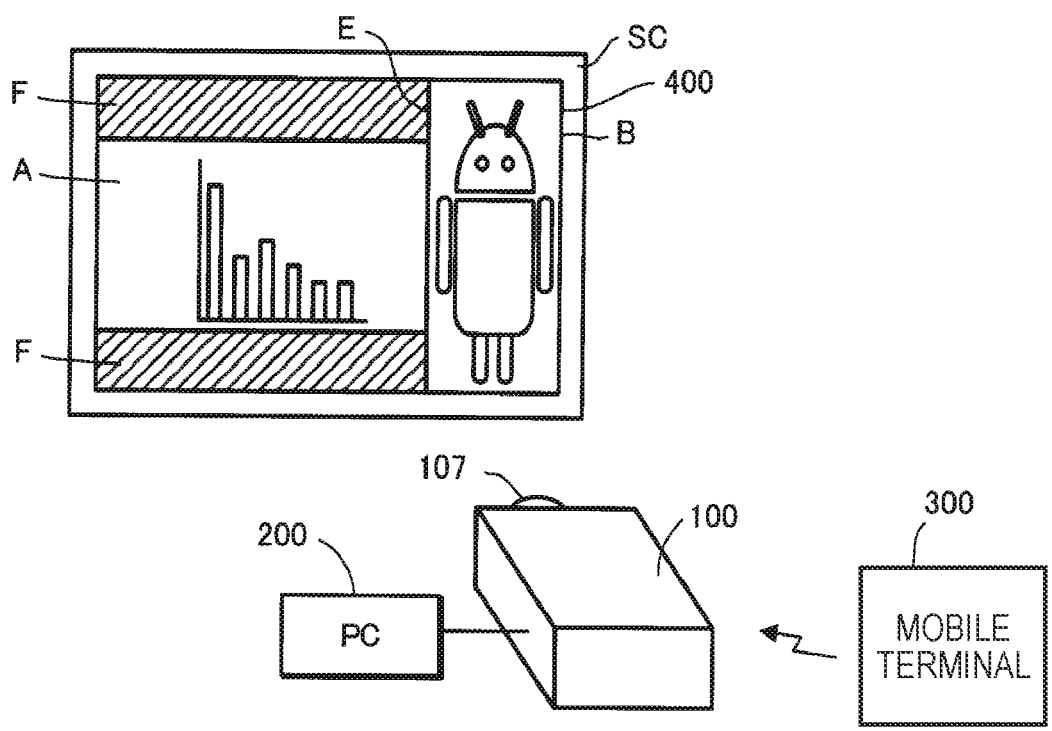
FIG. 1 is a diagram showing a projector according to a first embodiment.

Hereinafter, embodiments of the invention will be described with reference to the drawings. In the drawings, the dimensions and scales of each part are appropriately different from actual dimensions and scales. The embodiments described below are preferred specific examples of the invention. For this reason, various technically preferable limitations are imposed on the embodiments. However, the scope of the invention is not limited to the embodiments unless a particular description that limits the invention is mentioned in the following description.

First Embodiment

FIG. 1 is a diagram showing a projector 100 according to a first embodiment. The projector 100 is an example of a display device.

The projector 100 receives first image information indicating a first image A (an image representing a graph in FIG. 1) from a PC 200. The projector 100 receives second image information indicating a second image B (an image representing a character in FIG. 1) from a mobile terminal 300.

The PC 200 and the mobile terminal 300 are each an example of an image information supply device. The first image A is not limited to the image representing a graph but can be appropriately changed. The second image B is not limited to the image representing a character but can be appropriately changed. Each of the first image A and the second image B is rectangular.

The projector 100 generates, using the first image information and the second image information, a display image 400 including the first image A and the second image B.

Figure 2:
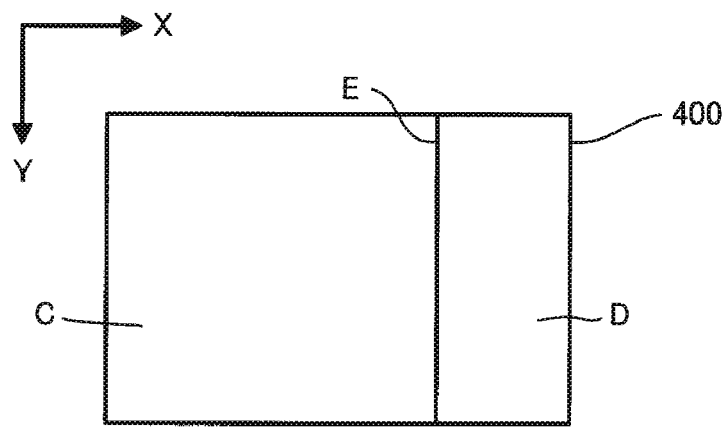
FIG. 2 is a diagram for explaining a display image.

FIG. 2 is a diagram for explaining the display image 400. The display image 400 is rectangular. The display image 400 includes a first area C where the first image A is disposed and a second area D where the second image B is disposed. In the example shown in FIGS. 1 and 2, the entire display image 400 is an example of a specific area.

The display image 400 is split into the first area C and the second area D by a boundary E between the first area C and the second area D. The first area C and the second area D are adjacent to each other. The first area C and the second area D are in a horizontally arranged (arranged in the X-direction) positional relationship in the display image 400. The boundary E is a straight line.

The shape (aspect ratio) of the first area C and the shape (aspect ratio) of the second area D vary according to the position of the boundary E. For example, when the boundary E is moved to the first area C side, the length of the first area C in the horizontal direction (X-direction) decreases without a change in length in the vertical direction (Y-direction) while the length of the second area D in the horizontal direction increases without a change in length in the vertical direction. When the boundary E is moved to the second area D side, the length of the first area C in the horizontal direction increases without a change in length in the vertical direction while the length of the second area D in the horizontal direction decreases without a change in length in the vertical direction.

The size of the first area C and the size of the second area D vary according to the position of the boundary E. For example, when the boundary E is moved to the first area C side, the first area C decreases in size while the second area D increases in size. When the boundary E is moved to the second area D side, the first area C increases in size while the second area D decreases in size.

The projector 100 disposes the first image A in the first area C such that the projector 100 maximizes the size of the first image A, while maintaining the aspect ratio thereof, to fit in the first area C, and also disposes the second image B in the second area D such that the projector 100 maximizes the size of the second image B, while maintaining the aspect ratio thereof, to fit in the second area D.

The projector 100 determines the position of the boundary E based on the shape of the first image A and the shape of the second image B. As described above, the aspect ratio of the first area C and the aspect ratio of the second area D are changed according to the position of the boundary E.

The projector 100 determines the position of the boundary E so as to reduce the size of an area (hereinafter referred to as "non-display area") F where neither the first image A nor the second image B is present in the display image 400.

The non-display area F is an example of a fifth area obtained by combining a third area where the first image A is not present in the first area C with a fourth area where the second image B is not present in the second area D. In FIG. 1, the non-display area F is shown by hatched lines.

When determining the position of the boundary E, the projector 100 generates the display image 400 by disposing, as described above, the first image A in the first area C such that the projector 100 maximizes the size of the first image A, while maintaining the aspect ratio thereof, to fit in the first area C, and also disposing the second image B in the second area D such that the projector 100 maximizes the size of the second image B, while maintaining the aspect ratio thereof, to fit in the second area D.

The projector 100 projects the display image 400 from a projection unit 107 and displays the display image 400 on a screen SC. The screen SC is an example of a display surface.

Figure 3:
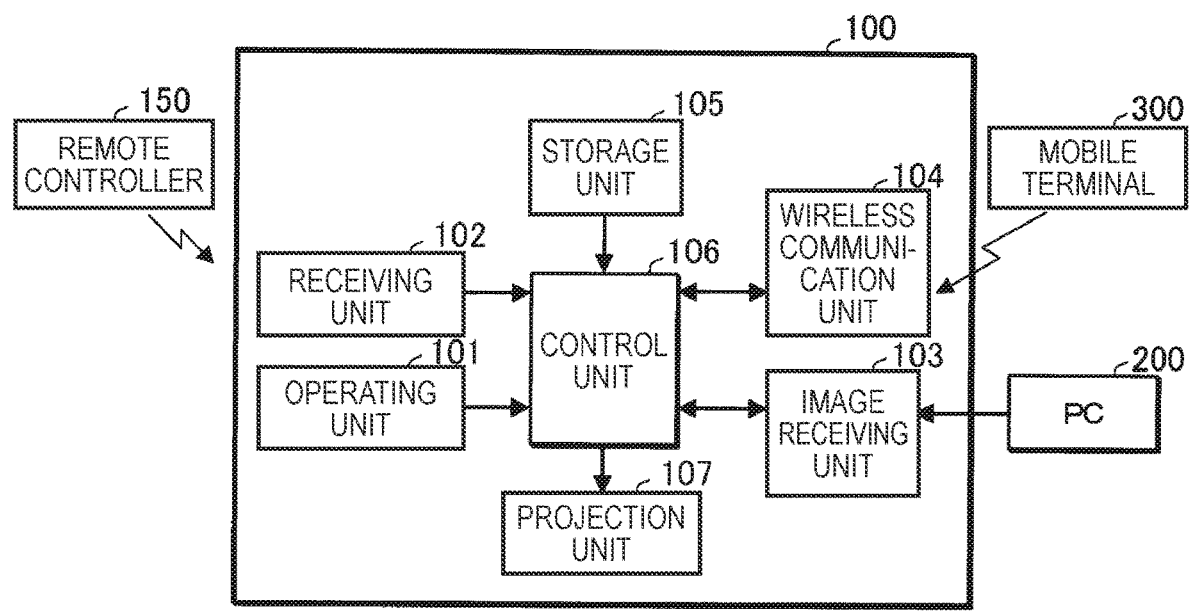
FIG. 3 is a diagram showing an example of the projector.

FIG. 3 is a diagram showing an example of the projector 100.

The projector 100 includes an operating unit 101, a receiving unit 102, an image receiving unit 103, a wireless communication unit 104, a storage unit 105, a control unit 106, and the projection unit 107.

The operating unit 101 includes various operating keys for operating the projector 100. For example, the operating unit 101 includes a split display key to instruct split display like the display image 400, and a menu key for performing various settings. The operating unit 101 outputs an operating signal according to the operating key operated to the control unit 106.

The receiving unit 102 receives an infrared signal transmitted by a remote controller 150, and outputs the operating signal according to the received infrared signal to the control unit 106. The remote controller 150 includes various operating keys (e.g., a split display key), and transmits an infrared signal according to an operation on the operating keys.

The image receiving unit 103 is, for example, an input terminal to which image information is input, or a wired LAN communication unit. The image receiving unit 103 receives the first image information from the PC 200 through a cable or the like.

The PC 200 outputs, to the projector 100, the first image information indicating an image represented at a transmission resolution suitable for the transmission of image information to the image receiving unit 103. The transmission resolution is expressed as the total number of pixels (the number of pixels in the horizontal direction×the number of pixels in the vertical direction) of an image. The transmission resolution is the resolution of an image that the projector 100 can display. The projector 100 notifies the PC 200 of the transmission resolution before the PC 200 outputs the first image information to the projector 100.

The first image information indicates a transmission first image K representing the first image A and a frame image J provided in a frame shape around the first image A. The resolution (the total number of pixels=the number of pixels in the horizontal direction×the number of pixels in the vertical direction) of the transmission first image K is set to the transmission resolution.

Figure 4:
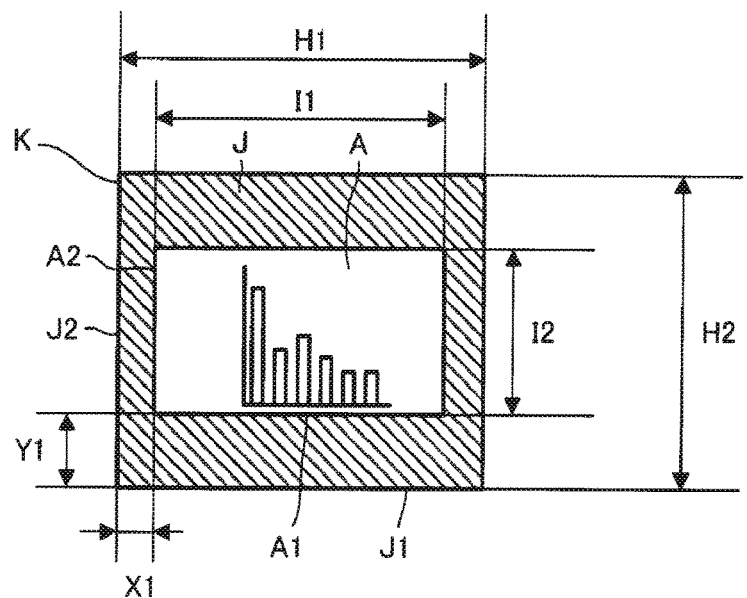
FIG. 4 is a diagram showing an example of a transmission first image, a first image, and a frame image.

FIG. 4 is a diagram showing an example of the transmission first image K, the first image A, and the frame image J.

First native resolution information indicating the resolution (I1×I2) of the first image A, an offset Y1, and an offset X1 are added to the first image information. The resolution (first native resolution) of the first image A is the resolution of the first image A that is displayed on the PC 200. The offset Y1 represents the number of pixels from a lower edge A1 of the first image A to a lower edge J1 of the frame image J. The offset X1 represents the number of pixels from a left edge A2 of the first image A to a left edge J2 of the frame image J. When the first native resolution is equal to the transmission resolution, the offset Y1 and the offset X1 each represent "0".

The first native resolution information, the offset Y1, and the offset X1 are used by the projector 100 to extract the first image A from the transmission first image K.

Returning to FIG. 3, the wireless communication unit 104 can wirelessly communicate with various apparatuses. The wireless communication unit 104 receives the second image information wirelessly transmitted from the mobile terminal 300 such as a smartphone.

The mobile terminal 300 transmits, to the projector 100, the second image information indicating an image represented at the transmission resolution. For example, the projector 100 notifies the mobile terminal 300 of the transmission resolution before the mobile terminal 300 outputs the second image information to the projector 100.

The second image information indicates a transmission second image M representing the second image B and a frame image L provided in a frame shape around the second image B. The resolution (the total number of pixels=the number of pixels in the horizontal direction×the number of pixels in the vertical direction) of the transmission second image M is set to the transmission resolution.

Figure 5:
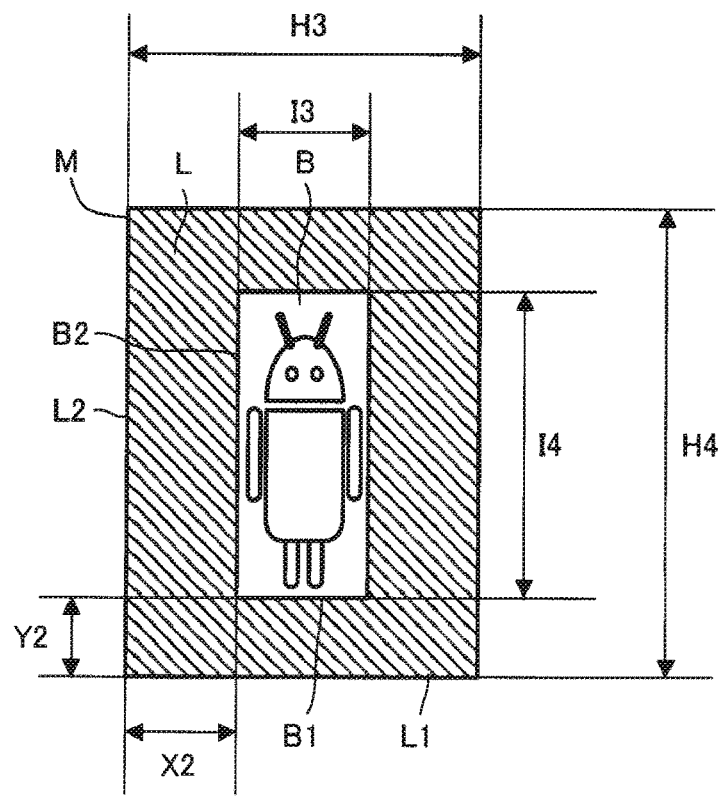
FIG. 5 is a diagram showing an example of a transmission second image, a second image, and a frame image.

FIG. 5 is a diagram showing an example of the transmission second image M, the second image B, and the frame image L.

Second native resolution information indicating the resolution (I3×I4) of the second image B, an offset Y2, and an offset X2 are added to the second image information. The resolution (second native resolution) of the second image B is the resolution of the second image B that is displayed on the mobile terminal 300. The offset Y2 represents the number of pixels from a lower edge B1 of the second image B to a lower edge L1 of the frame image L. The offset X2 represents the number of pixels from a left edge B2 of the second image B to a left edge L2 of the frame image L. When the second native resolution is equal to the transmission resolution, the offset Y2 and the offset X2 each represent "0".

The second native resolution information, the offset Y2, and the offset X2 are used by the projector 100 to extract the second image B from the transmission second image M.

Returning to FIG. 3, the storage unit 105 is a computer-readable recording medium. The storage unit 105 is, for example, a flash memory. The storage unit 105 is not limited to a flash memory but can be appropriately changed. The storage unit 105 stores, for example, a control program executed by the control unit 106.

The control unit 106 is, for example, a computer such as a central processing unit (CPU). The control unit 106 may be configured of one or a plurality of processors. The control unit 106 reads and executes the control program stored in the storage unit 105 to thereby control the projector 100. The control unit 106 is an example of a generating unit.

The control unit 106 generates the display image 400 using the first image information and the second image information. Specifically, the control unit 106 generates a display image signal according to the display image 400 using the first image information and the second image information.

The control unit 106 extracts the first image A from the transmission first image K indicated by the first image information using the first native resolution information, the offset Y1, and the offset X1. Moreover, the control unit 106 extracts the second image B from the transmission second image M indicated by the second image information using the second native resolution information, the offset Y2, and the offset X2.

The control unit 106 generates the display image 400 (the display image signal according to the display image 400) by disposing the first image A in the first area C such that the control unit 106 maximizes the size of the first image A, while maintaining the aspect ratio thereof, to fit in the first area C, and also disposing the second image B in the second area D such that the control unit 106 maximizes the size of the second image B, while maintaining the aspect ratio thereof, to fit in the second area D.

In the generation of the display image 400, the control unit 106 determines the position of the boundary E based on the shape of the first image A and the shape of the second image. The control unit 106 determines the position of the boundary E such that the size of the non-display area F is smaller than that when the boundary E is located at a position (hereinafter referred to as "reference position") where the boundary E makes the size of the first area C equal to the size of the second area D.

Figure 6:
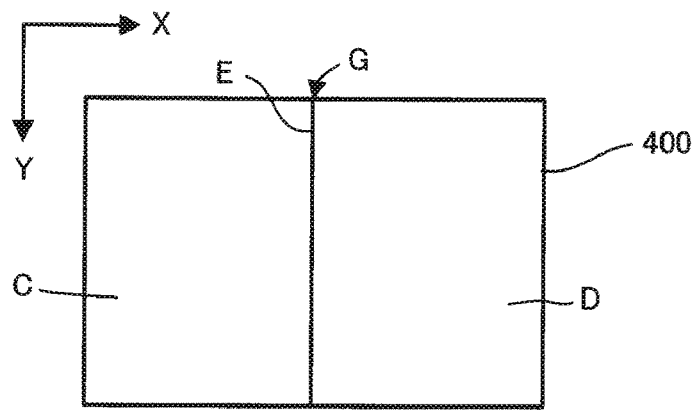
FIG. 6 is a diagram showing an example of a boundary positioned at a reference position.

FIG. 6 is a diagram showing an example of the boundary E positioned at the reference position G. The reference position G passes through the midpoint of the length of the rectangular display image 400 in the X-direction (horizontal direction).

Hereinafter, the first area C in a situation where the boundary E is positioned at the reference position G is also referred to as "first reference area", and the second area D in the situation where the boundary E is positioned at the reference position G is also referred to as "second reference area".

In a situation where the first area C and the second area D are in a positional relationship in which the first area C and the second area D are arranged in the X-direction, when the length of the first image A in the X-direction is the same as the length of the first area C (first reference area) in the X-direction and also the length of the second image B in the X-direction is shorter than the length of the second area D (second reference area) in the X-direction with the boundary E located at the reference position G, the control unit 106 positions the boundary E on the second area D side of the reference position G. Here, the X-direction is an example of a first direction.

Moreover, in the situation where the first area C and the second area D are in the positional relationship in which the first area C and the second area D are arranged in the X-direction, when the length of the first image A in the X-direction is shorter than the length of the first area C (first reference area) in the X-direction and also the length of the second image B in the X-direction is the same as the length of the second area D (second reference area) in the X-direction with the boundary E located at the reference position G, the control unit 106 positions the boundary E on the first area C side of the reference position G.

The control unit 106 outputs the display image signal according to the display image 400 to the projection unit 107.

The projection unit 107 is an example of a display unit. The display unit does not include a display surface such as the screen SC. The projection unit 107 projects and displays the display image 400 according to the display image signal output by the control unit 106 on the screen SC.

Figure 7:
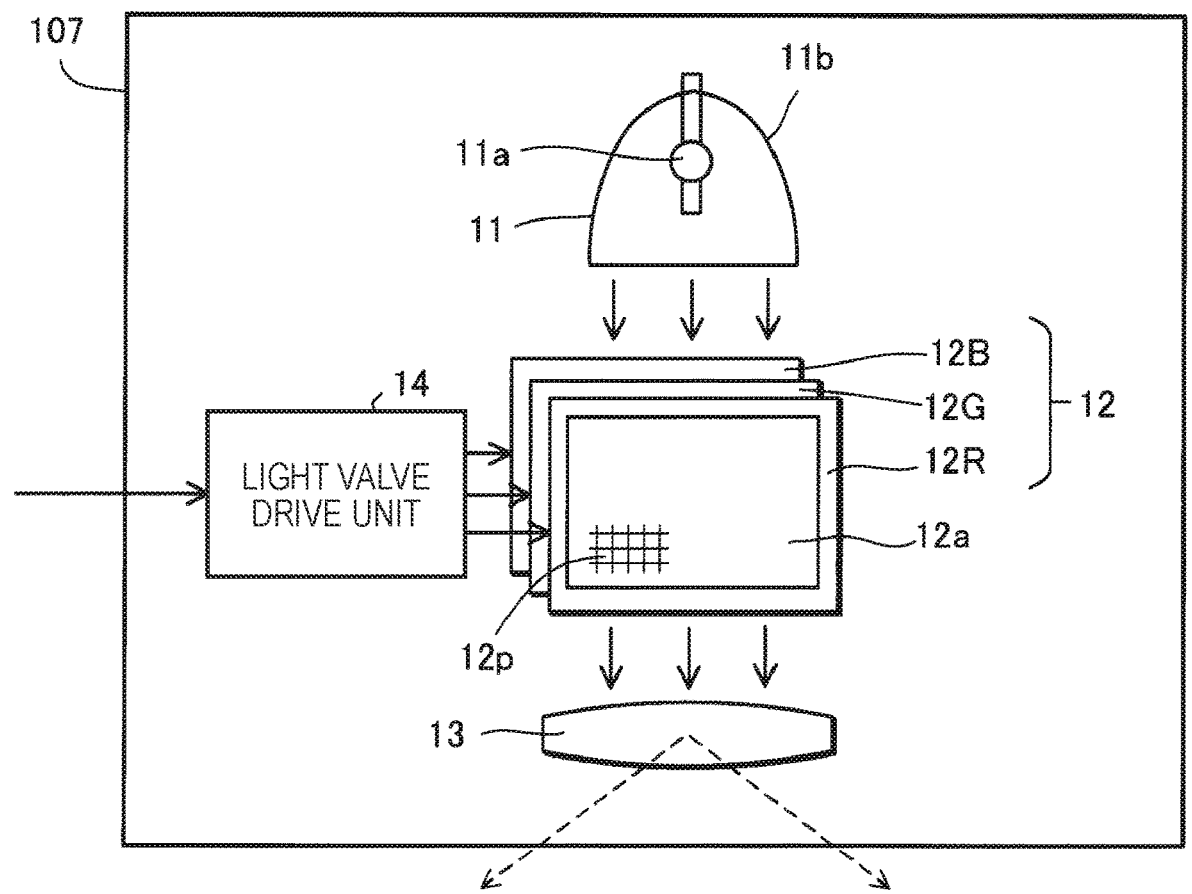
FIG. 7 is a diagram showing an example of a projection unit.

FIG. 7 is a diagram showing an example of the projection unit 107. The projection unit 107 includes a light source 11, three liquid crystal light valves 12 (12R, 12G, 12B) as an example of a light modulator, a projection lens 13 as an example of a projection optical system, and a light valve drive unit 14. The projection unit 107 modulates light emitted from the light source 11 with the liquid crystal light valves 12 to form the display image 400 (image light), and enlarges and projects the display image 400 through the projection lens 13. The display image 400 is displayed on the screen SC. Here, the display image 400 projected by the projection unit 107 is also referred generally to as "projection image".

The light source 11 includes a light source unit 11a composed of a xenon lamp, an extra-high-pressure mercury lamp, a light emitting diode (LED), a laser light source, or the like, and a reflector 11b that reduces variation in the direction of light emitted by the light source unit 11a. Variation in the luminance distribution of the light emitted from the light source 11 is reduced by an integrator optical system (not shown), and thereafter, the light is separated by a color separation optical system (not shown) into color light components of red (R), green (G), and blue (B), which are three primary colors of light. The color light components of R, G, and B are respectively incident on the liquid crystal light valves 12R, 12G, and 12B.

The liquid crystal light valve 12 is configured of, for example, a liquid crystal panel including liquid crystal enclosed between a pair of transparent substrates. In the liquid crystal light valve 12, a rectangular pixel area 12a composed of a plurality of pixels 12p arranged in a matrix is formed. In the liquid crystal light valve 12, a drive voltage can be applied to the liquid crystal in each of the pixels 12p. When the light valve drive unit 14 applies the drive voltage according to the display image signal input from the control unit 106 to each of the pixels 12p, each of the pixels 12p is set at a light transmittance according to the display image signal. For this reason, the light emitted from the light source 11 is modulated by transmitting through the pixel area 12a, and a display image according to the display image signal is formed for each of the color lights.

The images of the respective colors are combined by a color combining optical system (not shown) for each of the pixels 12p, and thus projection image light (projection image) as color image light (color image) is generated. The projection image light is enlarged and projected onto the screen SC by the projection lens 13.

Next, operations will be described.

Figure 8:
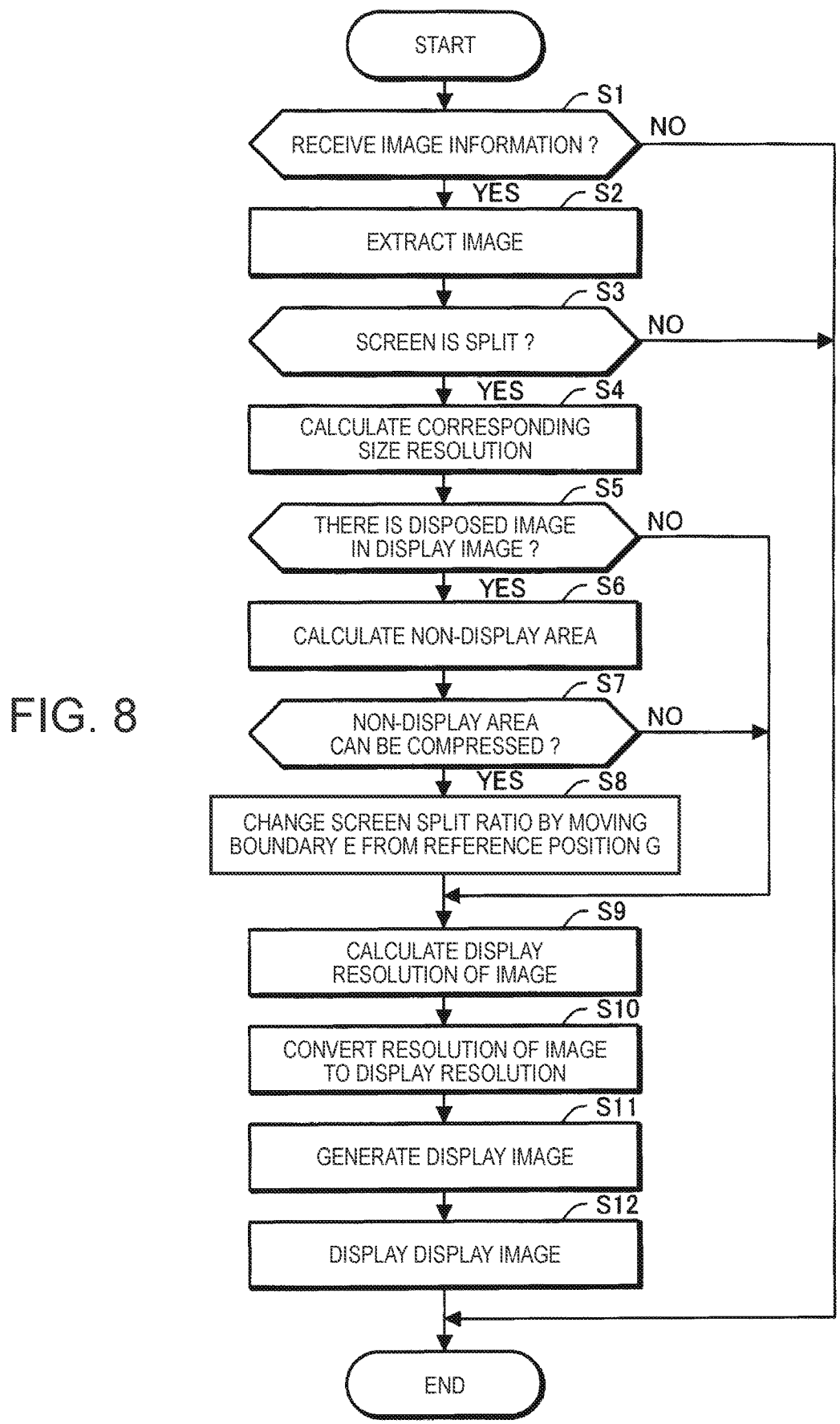
FIG. 8 is a diagram for explaining operations of the projector.

FIG. 8 is a flowchart for explaining operations of the projector 100, particularly an operation for determining the position of the boundary E and an operation for generating and projecting the display image 400. The operations shown in FIG. 8 are repetitively executed.

When a user operates the split display key of the remote controller 150 or the operating unit 101, the control unit 106 starts displaying the display image 400 composed of the first area C and the second area D.

For simplification of description, operations performed when the projector 100 receives the second image information from the mobile terminal 300 in a specific situation will be described. The specific situation is as follows: the first image information is input to the projector 100 but the second image information is not input thereto; the boundary E is located at the reference position G; the first image A is disposed in the first area C; and the second image B is not disposed in the second area D.

Figure 9:
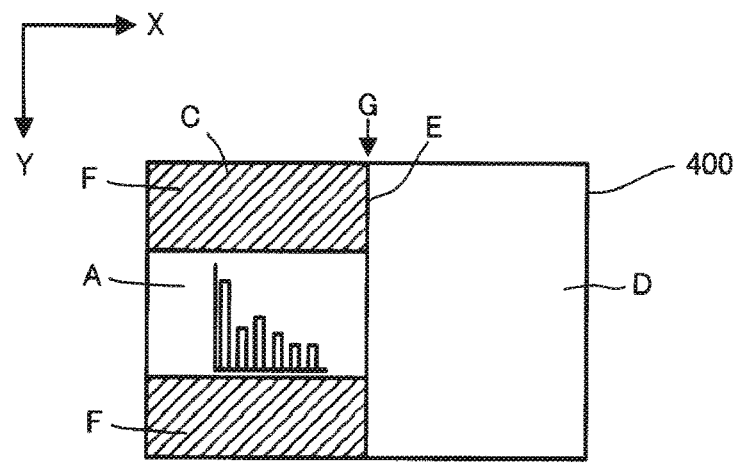
FIG. 9 is a diagram showing the display image in a specific situation.

FIG. 9 is a diagram showing the display image 400 in the specific situation.

When receiving the second image information from the mobile terminal 300 (Step S1), the wireless communication unit 104 outputs, to the control unit 106, the second image information, and the second native resolution information, the offset Y2, and the offset X2, which are added to the second image information.

When receiving the second image information, the second native resolution information, the offset Y2, and the offset X2, the control unit 106 extracts the second image B from the transmission second image M indicated by the second image information using the second native resolution information, the offset Y2, and the offset X2 (Step S2).

Subsequently, the control unit 106 determines whether or not the screen is split (Step S3). The control unit 106 determines that the screen is split because display of the display image 400 in which the first image A is disposed in the first area C but the second image B is not disposed in the second area D is executed.

When determining that the screen is split (YES in Step S3), the control unit 106 calculates a resolution (hereinafter referred to as "corresponding size resolution") representing the maximum size of the second image B to fit in the second area D (second reference area) while the aspect ratio of the second image B is maintained (Step S4).

Subsequently, the control unit 106 determines whether or not there is a disposed image in the display image 400 (Step S5). The control unit 106 determines that there is a disposed image in the display image 400 because the first image A is disposed in the first area C.

When determining that there is a disposed image in the display image 400 (YES in Step S5), the control unit 106 first disposes, in the situation where the boundary E is located at the reference position G, the first image A in the first area C such that the control unit 106 maximizes the size of the first image A, while maintaining the aspect ratio thereof, to fit in the first area C, and also disposes the second image B in the second area D such that the control unit 106 maximizes the size of the second image B, while maintaining the aspect ratio thereof, to fit in the second area D. Hereinafter, this arrangement state is referred to as "reference arrangement state".

Figure 10:
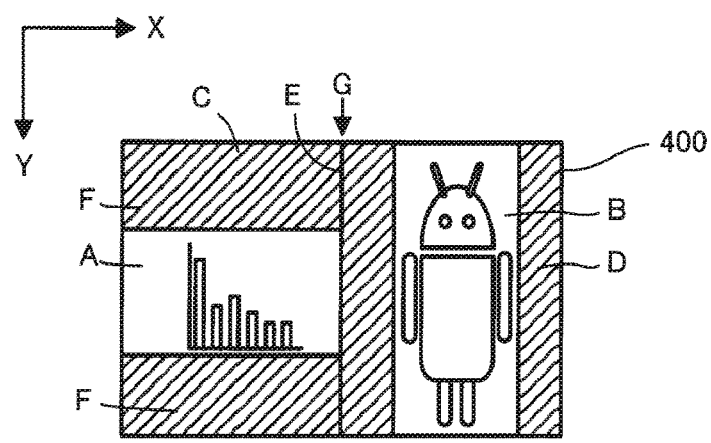
FIG. 10 is a diagram showing an example of a reference arrangement state.

FIG. 10 is a diagram showing an example of the reference arrangement state.

Subsequently, the control unit 106 calculates, in the reference arrangement state, a value Z1 obtained by subtracting the length of the first image A in the X-direction from the length of the first area C in the X-direction, and a value Z2 obtained by subtracting the length of the second image B in the X-direction from the length of the second area D in the X-direction (Step S6). The value Z1 and the value Z2 correspond to the non-display area in the X-direction.

Subsequently, the control unit 106 determines whether or not the non-display area can be compressed (Step S7). In the embodiment, the control unit 106 determines that the non-display area can be compressed when one of the value Z1 and the value Z2 is "0" and also the other of the value Z1 and the value Z2 is a positive value.

When determining that the non-display area can be compressed (YES in Step S7), the control unit 106 changes a screen split ratio by positioning the boundary E on the second area D side of the reference position G (Step S8). In the embodiment, the control unit 106 positions the boundary E on the second area D side of the reference position G by a distance of the value Z2. Hereinafter, this state after movement is referred to as "boundary moved state".

Figure 11:
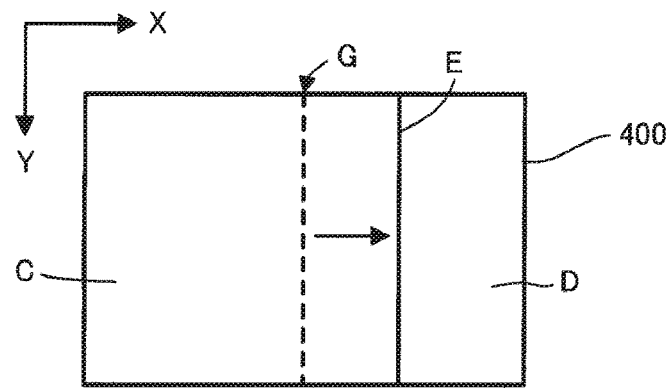
FIG. 11 is a diagram showing an example of a boundary moved state.

FIG. 11 is a diagram showing an example of the boundary moved state.

Subsequently, the control unit 106 calculates a resolution (hereinafter referred to as "first display resolution") representing the maximum size of the first image A to fit in the first area C in the boundary moved state while the aspect ratio of the first image A is maintained, and a resolution (hereinafter referred to as "second display resolution") representing the maximum size of the second image B to fit in the second area D in the boundary moved state while the aspect ratio of the second image B is maintained (Step S9).

Subsequently, the control unit 106 converts the resolution of the first image A to the first display resolution so that the size of the first image A is a size at the first display resolution, and converts the resolution of the second image B to the second display resolution so that the size of the second image B is a size at the second display resolution (Step S10).

Subsequently, the control unit 106 generates the display image 400 (specifically, the display image signal indicating the display image 400) by disposing the first image A at the first display resolution in the first area C in the boundary moved state, and disposing the second image B at the second display resolution in the second area D in the boundary moved state (Step S11).

Figure 12:
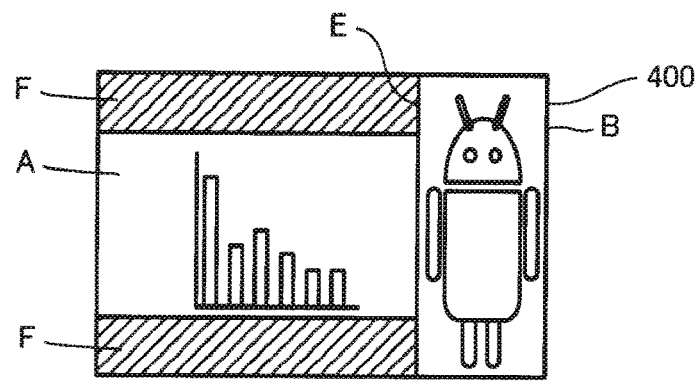
FIG. 12 is a diagram showing an example of the display image generated in Step S11.

FIG. 12 is a diagram showing an example of the display image 400 generated in Step S11.

Subsequently, the control unit 106 outputs the display image signal generated in Step S11 and indicating the display image 400 to the projection unit 107. The projection unit 107 projects and displays the display image 400 according to the display image signal received from the control unit 106 on the screen SC (Step S12).

When neither the image receiving unit 103 nor the wireless communication unit 104 receives new image information in Step S1 (NO in Step S1), the processes shown in FIG. 8 end.

When the screen is not split in Step S3, the control unit 106 ends the processes shown in FIG. 8, and causes the projection unit 107 to project the image extracted in Step S2.

When there is no disposed image in the display image 400 in Step S5, the following operations are executed in Step S9 to Step S12.

First, in Step S9, the control unit 106 calculates, as a display resolution, a resolution representing the maximum size of the image (hereinafter also referred to as "extracted image") extracted in Step S2, to fit in the first reference area or the second reference area while the aspect ratio of the extracted image is maintained.

Subsequently, in Step S10, the control unit 106 converts the resolution of the extracted image to the display resolution.

Subsequently, in Step S11, when image information serving as the source of the extracted image is received by the image receiving unit 103, the control unit 106 generates an image signal indicating the display image 400 in which the extracted image at the display resolution is disposed in the first area C. On the other hand, when the image information serving as the source of the extracted image is received by the wireless communication unit 104, the control unit 106 generates an image signal indicating the display image in which the extracted image at the display resolution is displayed in the second area D.

Subsequently, in Step S12, the control unit 106 outputs the image signal generated in Step S11 to the projection unit 107. The projection unit 107 projects and displays the display image according to the image signal on the screen SC.

When, in Step S7, neither the value Z1 nor the value Z2 is "0", and when both the value Z1 and the value Z2 are "0", the control unit 106 determines that the non-display area cannot be compressed. In this case (NO in Step S7), the following operations are executed in Step S9 to Step S12.

First, in Step S9 to Step S11, the control unit 106 generates an image signal indicating the display image 400 in the reference arrangement state.

Subsequently, in Step S12, the control unit 106 outputs the image signal indicating the display image 400 in the reference arrangement state to the projection unit 107. The projection unit 107 projects and displays the display image according to the image signal on the screen SC.

According to the projector 100 and the control method of the projector 100 of the embodiment, the position of the boundary E is determined based on the shape of the first image A and the shape of the second image B. For this reason, the shape of the first area C and the shape of the second area D can be changed based on the shape of the first image A and the shape of the second image B. Therefore, compared to the case where the shape of the first area C and the shape of the second area D are fixed, the degree of coincidence between the shape of the first area C and the shape of the first image A and the degree of coincidence between the shape of the second area D and the shape of the second image B can be made high, and the non-display area F can be reduced in the display image 400.

MODIFIED EXAMPLES

The invention is not limited to the embodiment described above, and, for example, various modifications described below can be made. Moreover, one or a plurality of modifications arbitrarily selected from the modified forms described below can be appropriately combined.

Modified Example 1

In the first embodiment, the first area C and the second area D are in the positional relationship in which the first area C and the second area D are arranged in the horizontal direction (X-direction) of the display image 400; however, the first area C and the second area D may be in a positional relationship in which the first area C and the second area D are arranged in the vertical direction (Y-direction) of the display image 400. In this case, the Y-direction is an example of the first direction.

Figure 13:
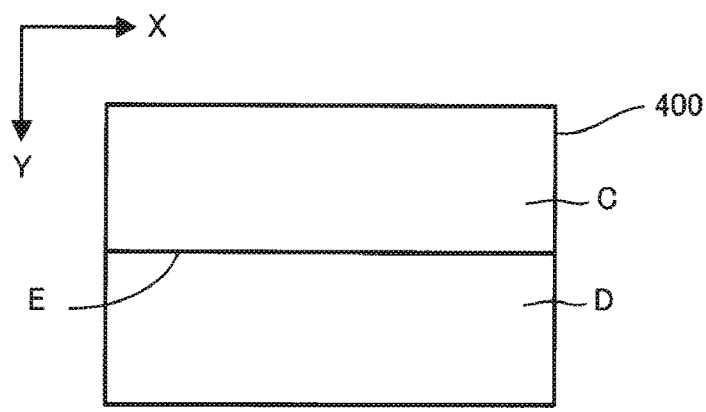
FIG. 13 is a diagram showing an example in which a first area and a second area are arranged in the vertical direction.

FIG. 13 is a diagram showing an example of the positional relationship in which the first area C and the second area D are arranged in the vertical direction (Y-direction) of the display image 400.

In this case, when the length of the first image A in the Y-direction is equal to the length of the first area C in the Y-direction and also the length of the second image B in the Y-direction is shorter than the length of the second area D in the Y-direction with the boundary E located at the reference position where the boundary E makes the size of the first area C equal to the size of the second area D, the control unit 106 positions the boundary E on the second area D side of the reference position.

Moreover, when the length of the first image A in the Y-direction is shorter than the length of the first area C in the Y-direction and also the length of the second image B in the Y-direction is equal to the length of the second area D in the Y-direction with the boundary E located at the reference position, the control unit 106 positions the boundary E on the first area C side of the reference position.

Modified Example 2

In the first embodiment, the entire display image 400 is used as the specific area of the display image 400. However, the specific area of the display image 400 is not limited to the entire display image 400 but may be a partial area of the display image 400.

Figure 14:
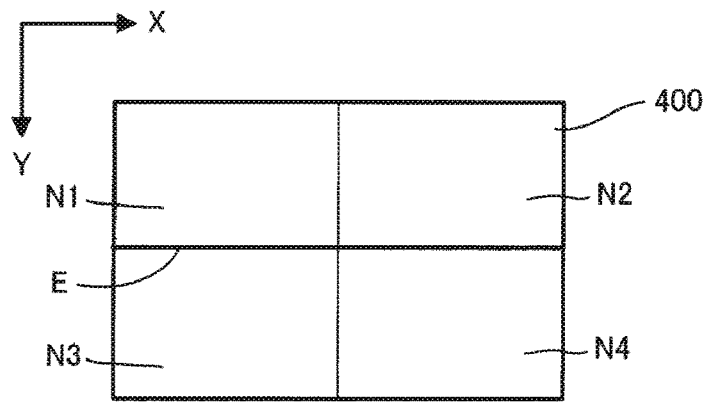
FIG. 14 is a diagram showing an example of the display image split into split areas.

For example, when the display image 400 is split into four split areas N1 to N4 as shown in FIG. 14, an area composed of the split area N1 and the split area N2, an area composed of the split area N3 and the split area N4, an area composed of the split area N1 and the split area N3, or an area composed of the split area N2 and the split area N4 may be used as the specific area of the display image 400.

Modified Example 3

The control unit 106 may determine the order of arrangement of the first area C and the second area D based on the shape of the first image A and the shape of the second image B.

As an example, in a situation where the first area C and the second area D are arranged in the X-direction as shown in FIG. 6, when the aspect ratio of the first image A represents the landscape orientation and also the aspect ratio of the second image B represents the landscape orientation, the control unit 106 may change the direction in which the first area C and the second area D are arranged to the Y-direction as shown in FIG. 13.

Moreover, in a situation where the first area C and the second area D are arranged in the Y-direction as shown in FIG. 13, when the aspect ratio of the first image A represents the portrait orientation and also the aspect ratio of the second image B represents the portrait orientation, the control unit 106 may change the direction in which the first area C and the second area D are arranged to the X-direction as shown in FIG. 6.

Figure 15:
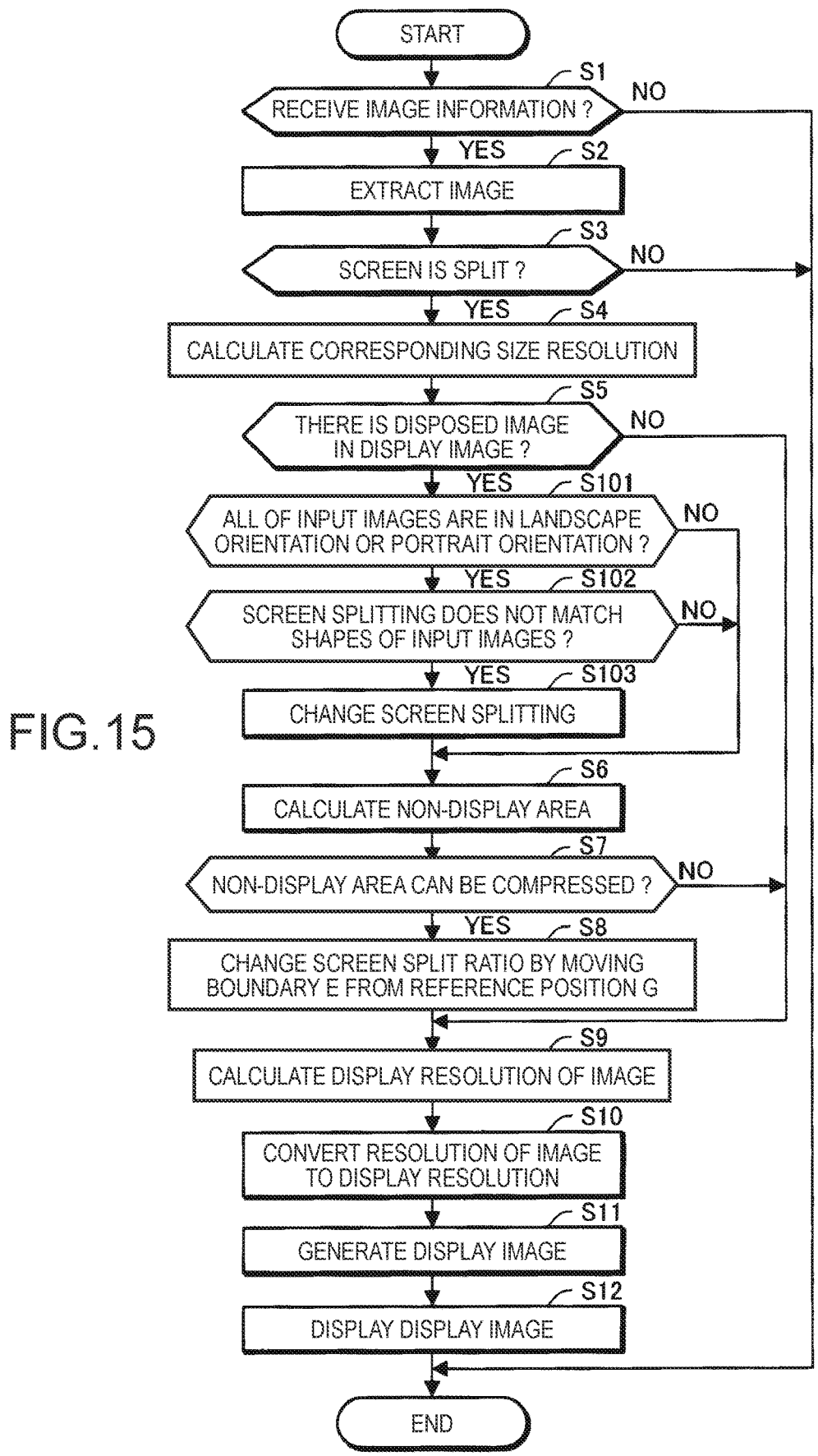
FIG. 15 is a flowchart for explaining an example of an operation in Modified Example 3.

FIG. 15 is a flowchart for explaining an example of an operation for changing the direction in which the first area C and the second area D are arranged based on the shape of the first image A and the shape of the second image B. In FIG. 15, the same processes as the processes shown in FIG. 8 are denoted by the same reference numerals and signs. Hereinafter, the operation shown in FIG. 15 will be described focusing on differences from the operation shown in FIG. 8.

When there is a disposed image in the display image 400 in Step S5 (YES in Step S5), the control unit 106 determines whether all of input images (both the first image A and the second image B) are in the landscape orientation or the portrait orientation (Step S101). Here, the control unit 106 determines based on the aspect ratio of the first image A whether the first image A is in the landscape orientation or the portrait orientation. Moreover, the control unit 106 determines based on the aspect ratio of the second image B whether the second image B is in the landscape orientation or the portrait orientation.

When determining that both the first image A and the second image B are in the landscape orientation or the portrait orientation (YES in Step S101), the control unit 106 determines whether or not the screen splitting matches the shapes of the input images (the first image A and the second image B) (Step S102).

When the screen splitting is such that the first area C and the second area D are arranged in the Y-direction (see FIG. 13) in the situation where both the first image A and the second image B are in the landscape orientation, the control unit 106 determines that the split screen matches the shapes of the input images.

When the screen splitting is such that the first area C and the second area D are arranged in the X-direction (see FIG. 6) in the situation where both the first image A and the second image B are in the landscape orientation, the control unit 106 determines that the split screen does not match the shapes of the input images.

Moreover, when the screen splitting is such that the first area C and the second area D are arranged in the X-direction (see FIG. 6) in the situation where both the first image A and the second image B are in the portrait orientation, the control unit 106 determines that the split screen matches the shapes of the input images.

When the screen splitting is such that the first area C and the second area D are arranged in the Y-direction (see FIG. 13) in the situation where both the first image A and the second image B are in the portrait orientation, the control unit 106 determines that the split screen does not match the shapes of the input images.

When determining that the split screen does not match the shapes of the input images (YES in Step S102), the control unit 106 changes the screen splitting (Step S103). Specifically, when the first area C and the second area D are arranged in the X-direction in the stage of Step S102, the control unit 106 changes the screen splitting such that the first area C and the second area D are arranged in the Y-direction. On the other hand, when the first area C and the second area D are arranged in the Y-direction in the stage of Step S102, the control unit 106 changes the screen splitting such that the first area C and the second area D are arranged in the X-direction.

When one of the first image A and the second image B is in the landscape orientation and the other is in the portrait orientation in Step S101 (NO in Step S101), Step S6 is executed. Moreover, when the screen splitting matches the shapes of the input images in Step S102 (NO in Step S102), Step S6 is executed.

Modified Example 4

When all of the input images are in the portrait orientation in the situation where the display image 400 is split into the four split areas N1 to N4 as shown in FIG. 14, the control unit 106 may change the splitting for the display image 400 such that the four split areas N1 to N4 are arranged in the X-direction.

Moreover, when all of the input images are in the landscape orientation in the situation where the display image 400 is split into the four split areas N1 to N4 as shown in FIG. 14, the control unit 106 may change the splitting for the display image 400 such that the four split areas N1 to N4 are arranged in the Y-direction.

Modified Example 5

Instead that the image receiving unit 103 receives the first image information and also the wireless communication unit 104 receives the second image information, for example one of the image receiving unit 103 and the wireless communication unit 104 may receive the first image information and the second image information.

Modified Example 6

When the transmission resolution coincides with the native resolution, the native resolution information, the offset X, and the offset Y may be omitted.

Modified Example 7

A split area of the display image 400 that is located on the left side of the boundary E is defined as the first area C, and a split area of the display image 400 that is located on the right side of the boundary E is defined as the second area D. However, the split area that is located on the left side of the boundary E may be defined as the second area D, and the split area that is located on the right side of the boundary E may be defined as the first area C.

Modified Example 8

The liquid crystal light valve is used as the light modulator in the projection unit 107; however, the light modulator is not limited to the liquid crystal light valve and can be appropriately changed. For example, the light modulator may be configured using three reflective liquid crystal panels. Moreover, the light modulator may be configured of a type that uses one liquid crystal panel, a type that uses three digital mirror devices (DMDs), a type that uses one digital mirror device, or the like. When only one liquid crystal panel or DMD is used as the light modulator, a member corresponding to the color separation optical system or the color combining optical system is not needed. Moreover, other than the liquid crystal panel and the DMD, a configuration that can modulate light emitted by a light source can be employed as the light modulator.

Modified Example 9

The projector is used as the display device; however, the display device is not limited to the projector and can be appropriately changed. For example, the display device may be a direct-view-type display. In this case, a direct-view-type display unit such as, for example, a liquid crystal display is used instead of the projection unit 107.

What is claimed is:

1. A display device comprising:
    a processor programmed to generate a display image including a first area where a first image is disposed and a second area where a second image is disposed; and
    a display unit that displays the display image on a display surface, wherein
        the display image includes a specific area,
        the specific area is split into the first area and the second area, and
        the processor is programmed to:
            determine the position of a boundary between the first area and the second area based on the shape of the first image and the shape of the second image,
            maximize the size of the first image, while maintaining the aspect ratio thereof, to fit in the first area,
            maximize the size of the second image, while maintaining the aspect ratio thereof, to fit in the second area, and
            determine the position of the boundary such that a size of a fifth area in a boundary moved state after the position of the boundary is moved is smaller than the size of the fifth area when the boundary is located at a reference position where the boundary makes the size of the first area equal to the size of the second area, the size of the fifth area being obtained by combining a third area where the first image is not present in the first area with a fourth area where the second image is not present in the second area.

2. The display device according to claim 1, wherein
    when, in a situation where the first area and the second area are in a positional relationship in which the first area and the second area are arranged in a first direction, the length of the first image in the first direction is the same as the length of the first area in the first direction and also the length of the second image in the first direction is shorter than the length of the second area in the first direction with the boundary located at the reference position, the generating unit positions the boundary on the second area side of the reference position.

3. The display device according to claim 2, wherein the first direction is a horizontal direction of the display image or a vertical direction of the display image.

4. A control method of a display device, comprising:
generating a display image including a first area where a first image is disposed and a second area where a second image is disposed; and
displaying the display image on a display surface, wherein
  the display image includes a specific area,
  the specific area is split into the first area and the second area,
  in the generating of the display image, the position of a boundary between the first area and the second area is determined based on the shape of the first image and the shape of the second image,
  the size of the first image is maximized, while maintaining the aspect ratio thereof, to fit in the first area,
  the size of the second image is maximized, while maintaining the aspect ratio thereof, to fit in the second area, and
    determine the position of the boundary such that a size of a fifth area in a boundary moved state after the position of the boundary is moved is smaller than the size of the fifth area when the boundary is located at a reference position where the boundary makes the size of the first area equal to the size of the second area, the size of the fifth area being obtained by combining a third area where the first image is not present in the first area with a fourth area where the second image is not present in the second area.

5. A display device comprising:
a processor programmed to generate a display image; and
a display unit that displays the display image on a display surface, wherein
  the display image includes a first image in a first area, a second image in a second area, and a boundary between the first area and the second area, and
  when the first image is in contact with the boundary and the second image is not in contact with the boundary, the generating unit moves the boundary closer to the second image and enlarges the size of the first image, while maintaining the aspect ratio thereof, to fit in the first area, and
  the processor is programmed to:
    maximize the size of the first image, while maintaining the aspect ratio thereof, to fit in the first area,
    maximize the size of the second image, while maintaining the aspect ratio thereof, to fit in the second area, and
    determine the position of the boundary such that a size of a fifth area in a boundary moved state after the position of the boundary is moved is smaller than the size of the fifth area when the boundary is located at a reference position where the boundary makes the size of the first area equal to the size of the second area, the size of the fifth area being obtained by combining a third area where the first image is not present in the first area with a fourth area where the second image is not present in the second area.

* * * * *